United States Patent
Yoo et al.

(10) Patent No.: US 8,768,093 B2
(45) Date of Patent: Jul. 1, 2014

(54) METHOD AND APPARATUS FOR REDUCING NOISE

(75) Inventors: Young-Jin Yoo, Guri-si (KR); Won-Hee Choe, Gyeongju-si (KR); Seong-Deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1350 days.

(21) Appl. No.: 11/898,210

(22) Filed: Sep. 10, 2007

(65) Prior Publication Data

US 2008/0181523 A1    Jul. 31, 2008

(30) Foreign Application Priority Data

Jan. 30, 2007  (KR) .................. 10-2007-0009600

(51) Int. Cl.
 *G06K 9/40*   (2006.01)
(52) U.S. Cl.
 USPC .......................................... 382/275; 382/264
(58) Field of Classification Search
 USPC .................................. 382/264, 275
 See application file for complete search history.

(56) References Cited

U.S. PATENT DOCUMENTS

| | | | | |
|---|---|---|---|---|
| 5,563,963 A * | 10/1996 | Kaplan et al. | .................. | 382/266 |
| 5,594,807 A * | 1/1997 | Liu | .................. | 382/128 |
| 5,825,423 A * | 10/1998 | Jung | .................. | 375/240.14 |
| 5,923,775 A * | 7/1999 | Snyder et al. | .................. | 382/172 |
| 6,069,982 A * | 5/2000 | Reuman | .................. | 382/275 |
| 6,108,455 A * | 8/2000 | Mancuso | .................. | 382/261 |
| 6,539,125 B1 * | 3/2003 | Harrington | .................. | 382/262 |
| 6,681,054 B1 * | 1/2004 | Gindele | .................. | 382/272 |
| 6,718,068 B1 * | 4/2004 | Gindele et al. | .................. | 382/254 |
| 6,757,442 B1 * | 6/2004 | Avinash | .................. | 382/274 |
| 8,253,825 B2 * | 8/2012 | Morel et al. | .................. | 348/241 |
| 8,411,939 B2 * | 4/2013 | Roffet et al. | .................. | 382/162 |
| 8,427,559 B2 * | 4/2013 | Morel et al. | .................. | 348/241 |
| 2002/0154820 A1 * | 10/2002 | Kaneko et al. | .................. | 382/209 |
| 2009/0141978 A1 * | 6/2009 | Roffet et al. | .................. | 382/167 |
| 2010/0141804 A1 * | 6/2010 | Morel et al. | .................. | 348/241 |
| 2012/0268623 A1 * | 10/2012 | Morel et al. | .................. | 348/229.1 |

FOREIGN PATENT DOCUMENTS

| | | |
|---|---|---|
| JP | 2000-50109 | 2/2000 |
| KR | 10-2005-0102805 | 10/2005 |
| KR | 10-2006-0020801 | 3/2006 |
| KR | 10-2006-0098227 | 9/2006 |
| WO | WO 2005/122086 | * 12/2005 |

OTHER PUBLICATIONS

Morel et al., Machine/Google Translation of WO 2005/122086, published on Dec. 22, 2005.*

* cited by examiner

*Primary Examiner* — Aaron W Carter
(74) *Attorney, Agent, or Firm* — Staas & Halsey LLP

(57) ABSTRACT

The present invention relates to a method and apparatus for reducing noise. A method of reducing noise according to an aspect of the present invention includes calculating a noise level of a reference pixel forming an input image, determining a weighted value to be allocated to the reference pixel based on similarity of a reference window including the reference pixel with respect to at least one comparative window existing in a comparative region of the input image and having the same size as the reference window, and the calculated noise level of the reference pixel, and filtering the input image using the determined weighted value.

18 Claims, 25 Drawing Sheets

VERTICAL DIRECTION

HORIZONTAL DIRECTION

LOWER LEFT TO UPPER RIGHT DIRECTION

UPPER LEFT TO LOWER RIGHT DIRECTION

FIG. 4A

| R | G1 | R | G1 | R | G1 | R | G1 | R | G1 |
|---|----|---|----|---|----|---|----|---|----|
| G2 | B | G2 | B | G2 | B | G2 | B | G2 | B |
| R | G1 | R | G1 | R | G1 | R | G1 | R | G1 |
| G2 | B | G2 | B | G2 | B | G2 | B | G2 | B |
| R | G1 | R | G1 | R | G1 | R | G1 | R | G1 |
| G2 | B | G2 | B | G2 | B | G2 | B | G2 | B |
| R | G1 | R | G1 | R | G1 | R | G1 | R | G1 |
| G2 | B | G2 | B | G2 | B | G2 | B | G2 | B |
| R | G1 | R | G1 | R | G1 | R | G1 | R | G1 |
| G2 | B | G2 | B | G2 | B | G2 | B | G2 | B |

410

VERTICAL DIRECTION

ARRANGEMENT ORDER OF PIXEL VALUES

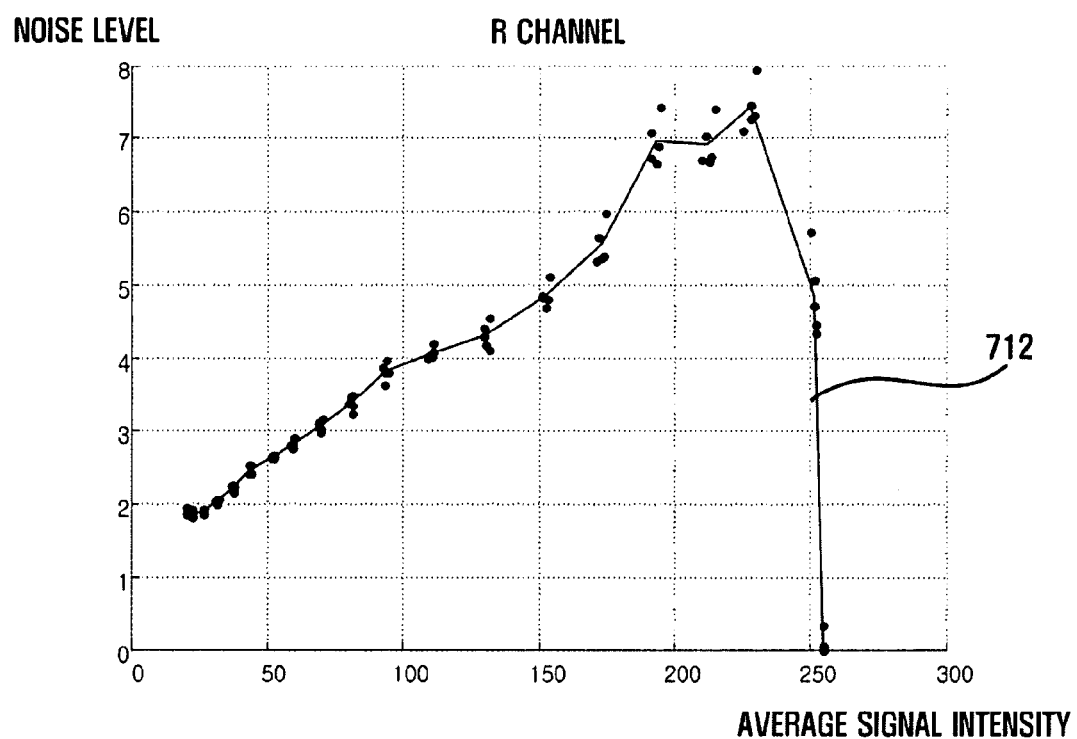

METHOD AND APPARATUS FOR REDUCING NOISE

CROSS-REFERENCE TO RELATED APPLICATIONS

This application claims priority from Korean Patent Application No. 10-2007-0009600 filed on Jan. 30, 2007 in the Korean Intellectual Property Office, the disclosure of which is incorporated herein by reference in its entirety.

BACKGROUND

1. Field

One or more embodiments of the present invention relate to noise in images, and more particularly, to a method and apparatus for reducing noise in input images.

2. Description of the Related Art

In recent years, digital imaging systems, such as digital still cameras and digital camcorders, have spread. Images captured by the digital imaging systems include noise that degrades image quality. Therefore, it is essential to remove noise in order to obtain high quality images.

High level noise is present in supersensitive images that are captured under an environment of low illuminance. In order to effectively remove high level noise, a large filtering kernel needs to be used. However, according to the related art, as noise reduction performance increases, fineness of images may be lowered. Accordingly, there is a need for a technique that effectively removes noise in an image based on the relationship between pixels forming the image and other adjacent pixels.

SUMMARY

One or more embodiments of the present invention reduce noise in an input image.

Additional aspects and/or advantages will be set forth in part in the description which follows and, in part, will be apparent from the description, or may be learned by practice of the invention.

According to an aspect of the present invention, there is provided a method of reducing noise, the method including calculating a noise level of a reference pixel forming an input image, determining a weighted value to be allocated to the reference pixel based on similarity of a reference window including the reference pixel with respect to at least one comparative window existing in a comparative region of the input image and having the same size as the reference window, and the calculated noise level of the reference pixel, and filtering the input image using the determined weighted value.

According to another aspect of the present invention, there is provided an apparatus for reducing noise, the apparatus including a noise level calculation unit calculating a noise level of a reference pixel forming an input image, a weighted value determination unit determining a weighted value to be allocated to the reference pixel based on similarity of a reference window including the reference pixel with respect to at least one comparative window existing in a comparative region of the input image and having the same size as the reference window, and the calculated noise level of the reference pixel, and a filtering unit filtering the input image using the determined weighted value.

BRIEF DESCRIPTION OF THE DRAWINGS

These and/or other aspects and advantages will become apparent and more readily appreciated from the following description of the embodiments, taken in conjunction with the accompanying drawings of which:

FIG. 4A is a diagram showing a local region of an RGB Bayer pattern;

FIGS. 7A to 7C are diagrams showing the experiment results on the relationship between a signal intensity and a noise level;

DETAILED DESCRIPTION OF EMBODIMENTS

Figure 1:
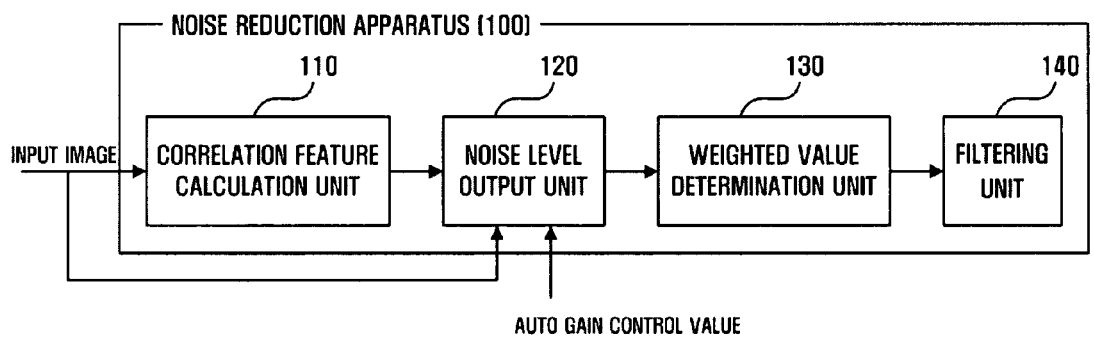
FIG. 1 is a block diagram showing an apparatus for reducing noise according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 is a block diagram showing an apparatus for reducing noise (hereinafter, referred to "noise reduction apparatus") 100 according to an embodiment of the present invention. The noise reduction apparatus 100 shown in FIG. 1 includes a correlation feature calculation unit 110, a noise level calculation unit 120, a weighted value determination unit 130, and a filtering unit 140. The noise reduction apparatus 100 may be applied to imaging systems, such as digital still cameras and digital camcorders.

For reference, in this embodiment, a description will be given focusing on a case where an input image is processed with an RGB Bayer domain. However, the present invention is not limited thereto. For example, in a case where an input image is processed with a YUV or YCrCb domain, a method of reducing noise can be understood by referring to this embodiment. Of course, it should be understood that all of RGB Bayer, YUV and YCrCb domains fall within the scope of the present invention.

The correlation feature calculation unit 110 calculates a correlation feature of a local region based on pixel values of pixels in the local region of the input image. The correlation feature includes information on a direction having the highest correlation between pixels among a plurality of candidate directions previously set in the local region (hereinafter, simply referred to as an "activity direction") and information on a degree of activity indicating how high the correlation of the activity direction is compared with the correlation of the candidate directions.

The local region is a part of the input image, and includes a pixel that is currently of interest in the input image for noise reduction (hereinafter, simply referred to as "reference pixel"). Preferably, the reference pixel is located at the center of the local region. The noise reduction is sequentially performed on all pixels of the input image. That is, the position of the reference pixel changes as the noise reduction is performed. The position of the local region including the reference pixel may also change as the noise reduction is performed. Further, the size of the local region may vary according to the size of the input image, arithmetic capability of the noise reduction apparatus, efficiency of image processing, and the like.

For reference, the following description will be given focusing on the reference pixel. However, as described above, the position of the reference pixel changes as the noise reduction is performed, and all pixels of the input image will be set as the reference pixel at least one time. As a result, when the components of the noise reduction apparatus 100 perform a predetermined operation on the reference pixel, it will be understood that the same operation is performed on all pixels of the input image, that is, the entire input image.

Figure 2:
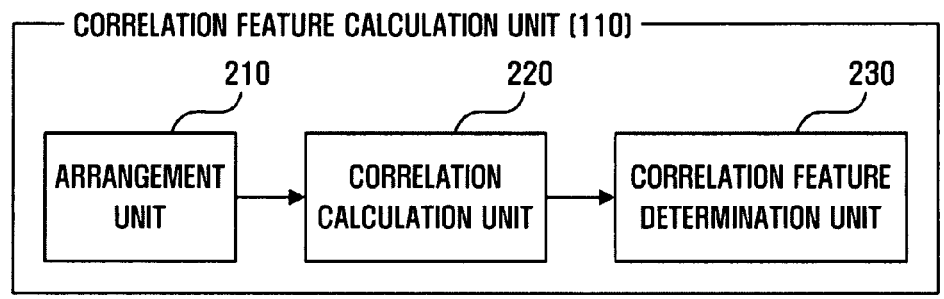
FIG. 2 is a block diagram showing a correlation feature calculation unit according to an embodiment of the present invention.
Figure 3A:
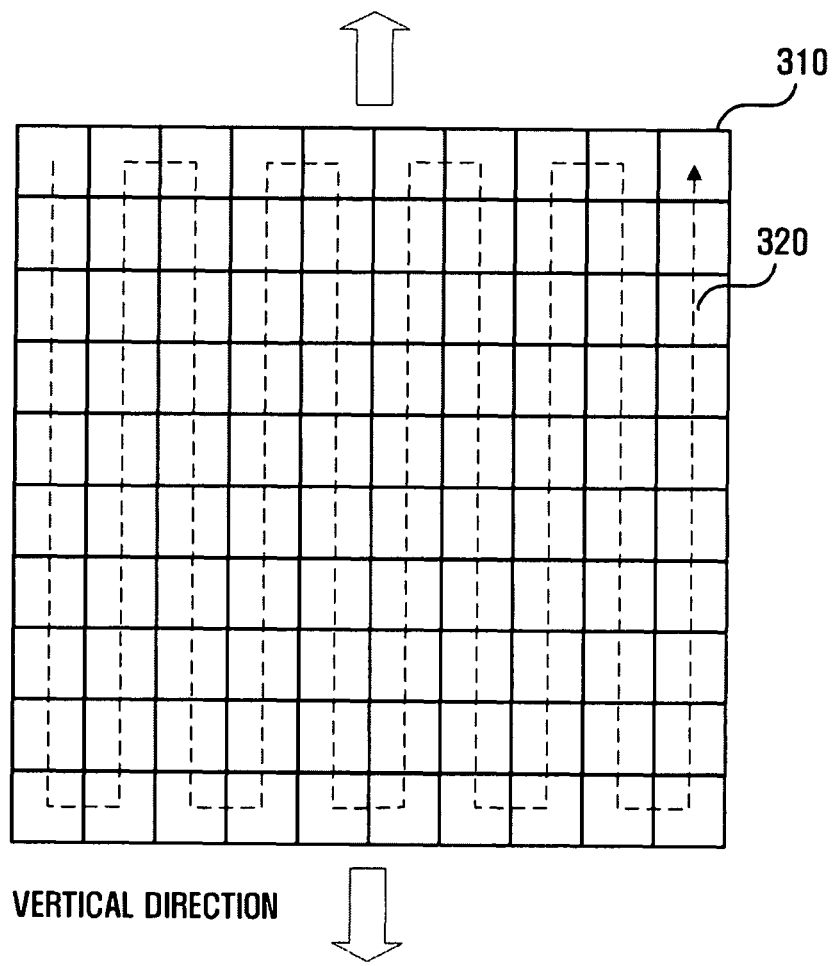
FIG. 3A to 3D are diagrams showing the arrangement orders of pixel values corresponding to vertical direction, horizontal direction, a lower left to upper right direction, and an upper left to lower right direction of a local region.
Figure 3B:
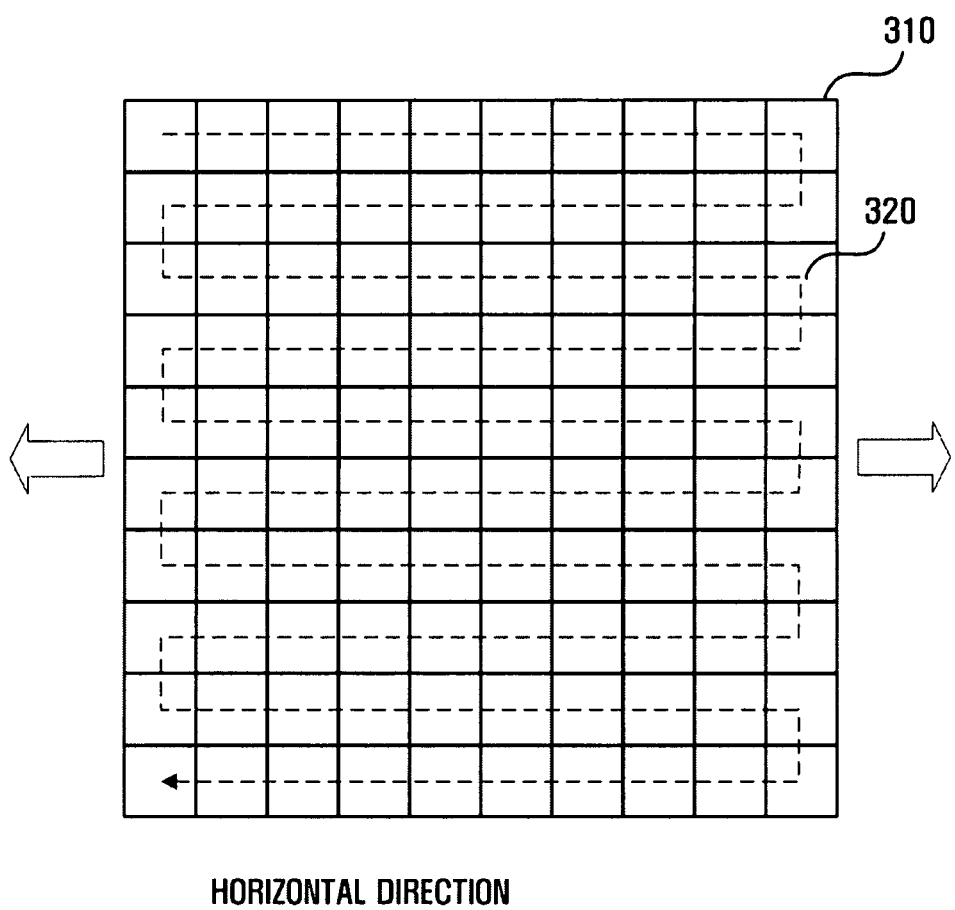
Figure 3C:
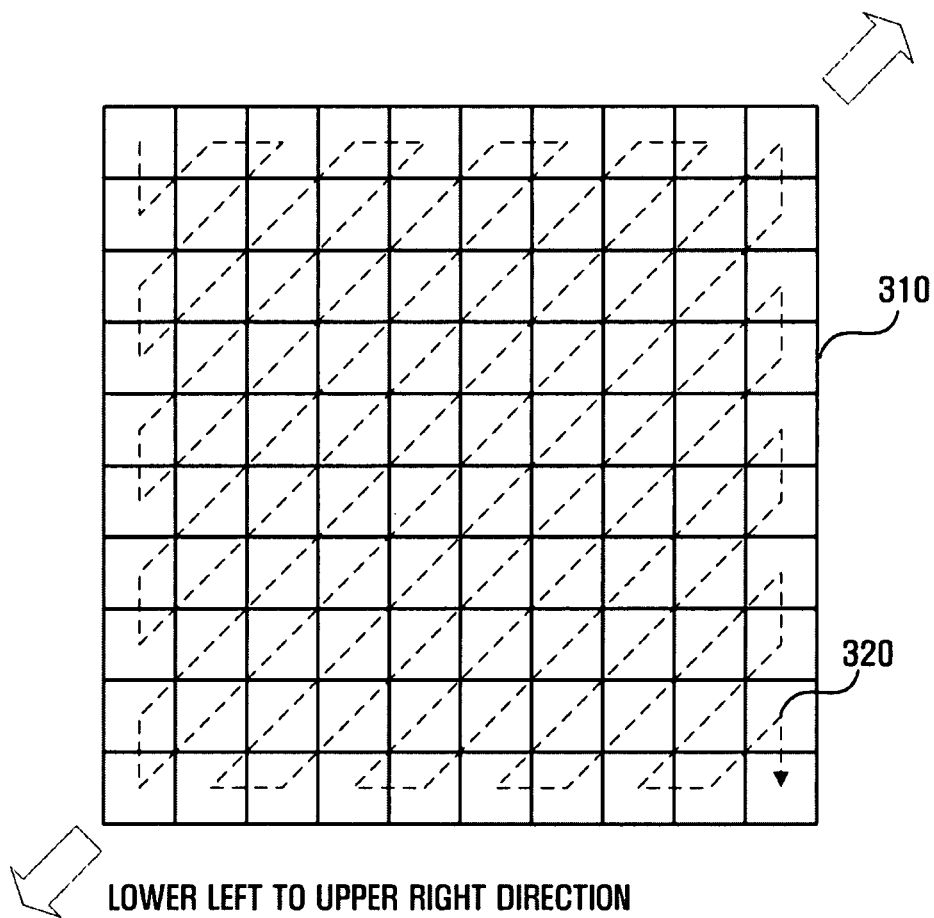
Figure 3D:
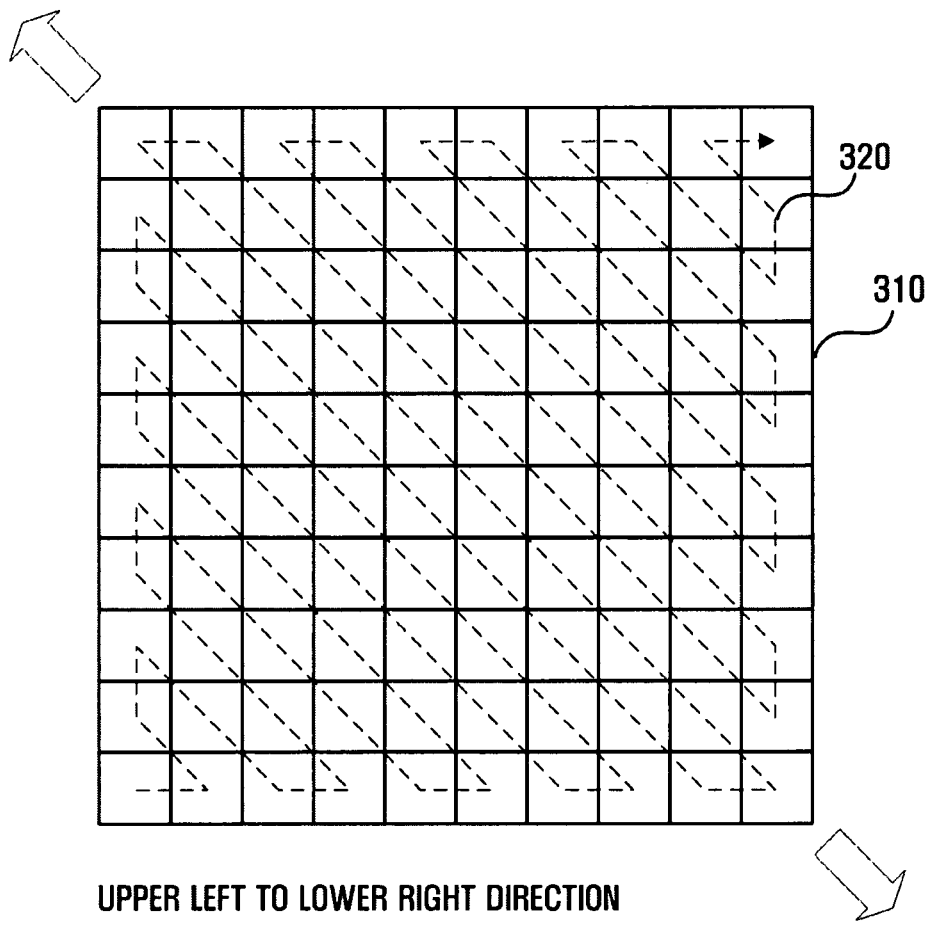

FIG. 2 shows the structure of the correlation feature calculation unit 110 according to an embodiment of the present invention. The correlation feature calculation unit 110 includes an arrangement unit 210, a correlation calculation unit 220, and a correlation feature determination unit 230.

The arrangement unit 210 arranges the pixel values of pixels in the local region in an order corresponding to each of the candidate directions previously set. Examples of the candidate directions according to the embodiment of the present invention may include vertical direction, horizontal direction, a lower left to upper right direction, and an upper left to lower right direction. Humans have visual characteristics sensitive to a change in the vertical direction, the horizontal direction, the lower left to upper right direction, and the upper left to lower right direction. Therefore, the correlation between the pixel values that are arranged in each of the above-described directions can be efficiently used for noise reduction. However, the present invention is not limited thereto, but another candidate direction may be used.

FIGS. 3A to 3D show the arrangement orders of the pixel values corresponding to the vertical direction, the horizontal direction, the lower left to upper right direction, and the upper left to lower right direction of a local region 310. In FIGS. 3A to 3D, blocks forming the local region 310 indicate pixels, and a transition order of a dashed arrow 320 corresponds to the arrangement order of the pixel values of the pixels in the local region 310. The arrangement orders of the pixel values shown in FIGS. 3A to 3D are just examples of the present invention, and the present invention is not limited thereto.

Figure 4B:
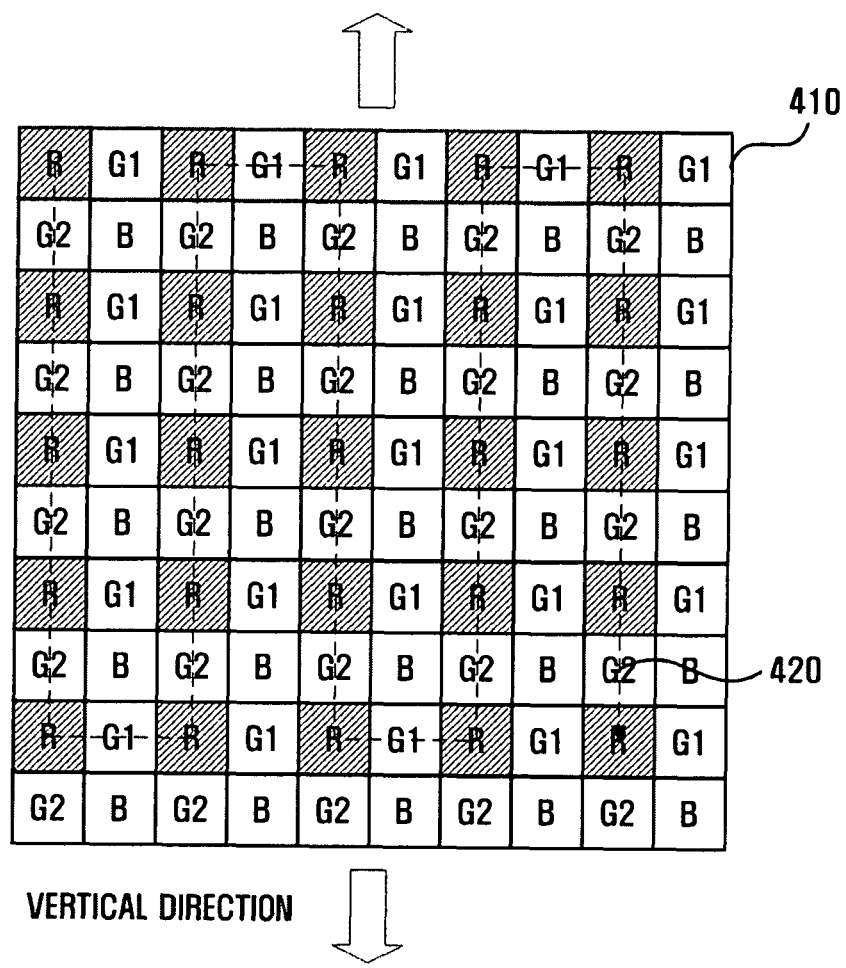
FIG. 4B is a diagram showing the arrangement order of pixel values according to an embodiment of the present invention.

Preferably, the arrangement of the pixel values is performed by channels in a color domain applied to the input image. For example, in an RGB Bayer pattern shown in FIG. 4A, pixels corresponding to four optical channels R, G1, G2, B exist together in a local region 410. Among these, based on the channel R, pixel values of pixels to which the channel R is applied may be arranged in the local region 410. FIG. 4B shows an example where pixel values are arranged in the vertical direction based on the channel R. Since the pixel values are arranged based on the channel R, the arrangement unit 210 arranges the pixel values of the pixels (shaded pixels) corresponding to the channel R among the pixels, on which the dashed arrow 420 is placed, according to the order in which the dashed arrow 420 moves. A channel that is used when the pixel values are arranged may be determined according to an optical channel of the reference pixel.

Figure 5:
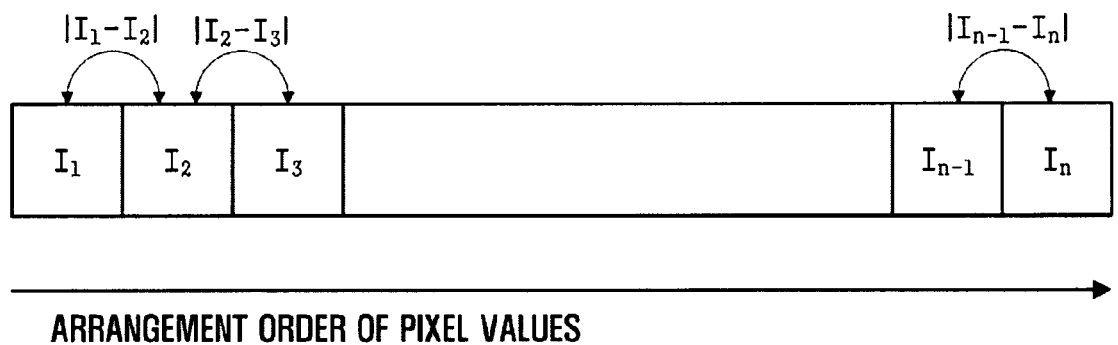
FIG. 5 is a diagram showing a method of calculating correlation according to an embodiment of the present invention.

Returning to FIG. 2, the correlation calculation unit 220 calculates the correlation on each of the candidate directions using the arranged pixel values. According to the embodiment of the present invention, as shown in FIG. 5 and represented by Equation 1, the correlation calculation unit 220 may calculate the sum of the absolute values of differences between adjacent pixel values among the arranged pixel values and may provide the calculation result as a correlation indicator with respect to a candidate direction.

$$C = \sum_{i=1}^{n-1} |I_i - I_{i+1}|$$ Equation 1

In Equation 1, C denotes a correlation indicator, $I_i$ denotes an i-th pixel value among the arranged pixel values, and n denotes the number of arranged pixel values. In this case, the lower the value of the correlation indicator, the higher the correlation. When the correlation indicator is appropriately used, the correlation may be numerically expressed. For example, the correlation may be a constant multiple of the reciprocal of the correlation indicator C. Of course, Equation 1 is not necessarily the only equation that may be used to calculate the correlation. Other methods of calculating the correlation between the pixels may be equally used.

The correlation feature determination unit 230 provides information on an activity direction and the degree of activity of the local region based on the correlation calculated by the correlation calculation unit 22. When the correlation calculation unit 220 calculates the correlation indicator using Equation 1, a candidate direction having the lowest correlation indicator may be determined as the activity direction of the local region. Further, as an example that determines the degree of activity, the correlation feature determination unit 230 may use a difference between the highest correlation indicator and the lowest correlation indicator among the correlation indicators that are calculated with respect to the respective candidate directions, as shown in FIG. 2. Alternatively, the correlation feature determination unit 230 may use a ratio between the highest correlation indicator and the lowest correlation indicator, as represented by Equation 3.

$$Q = C_{max} - C_{min} \quad \text{Equation 2}$$

$$Q = \frac{C_{max}}{C_{min}} \quad \text{Equation 3}$$

In Equations 2 and 3, Q denotes a numeric value indicating the degree of activity, $C_{max}$ denotes the highest correlation indicator, and $C_{min}$ denotes the lowest correlation indicator. When Equation 2 or Equation 3 is used, as the degree of activity is high, the activity direction has relatively higher correlation than another candidate direction. However, the present invention is not limited thereto and other methods that calculate the degree of activity may be equally used.

Returning to FIG. 1, the noise level calculation unit 120 calculates a noise level of the reference pixel. The noise level is a numeric value that indicates the size of noise. Representative factors among factors that affect the noise level (hereinafter, referred to as "noise factors") may include a signal intensity and an auto gain control (AGC) value according to auto exposure (AE) upon image capturing. Here, the signal intensity means a numeric value that estimates the amount of light to be collected at each pixel when an input image is captured. According to the embodiment of the present invention, the pixel value of each pixel may be used as the signal intensity. The noise level calculation unit 120 can calculate the noise level of the reference pixel based on the noise factors and the degree of activity of the local region including the reference pixel. Among the noise factors, the auto gain control value may be acquired from an imaging system to which the noise reduction apparatus 100 is applied.

Figure 6:
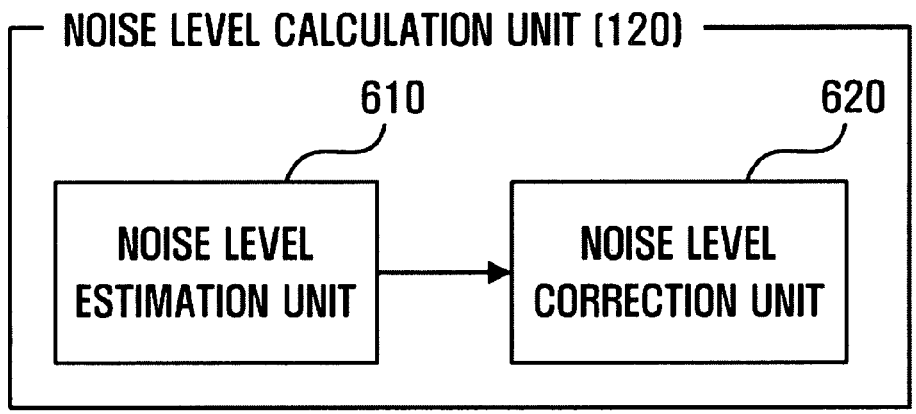
FIG. 6 is a block diagram showing a noise level calculation unit according to an embodiment of the present invention.

FIG. 6 is a block diagram showing the noise level calculation unit 120 according to an embodiment of the present invention. The noise level calculation unit 120 includes a noise level estimation unit 610 and a noise level correction unit 620.

The noise level estimation unit 610 estimates the noise level of the reference pixel by noise factors. The noise level of the reference pixel estimated by the noise level estimation unit 610 is a temporary noise level. The noise levels by the noise factors may be previously set through the experiments on the imaging system to which the noise reduction apparatus 100 is applied. The noise level estimation unit 610 may estimate the noise level of the reference pixel using the noise levels by the noise factors. Hereinafter, referring to FIGS. 7A to 9C, the noise level estimation unit 610 will be described in detail.

Figure 7B:
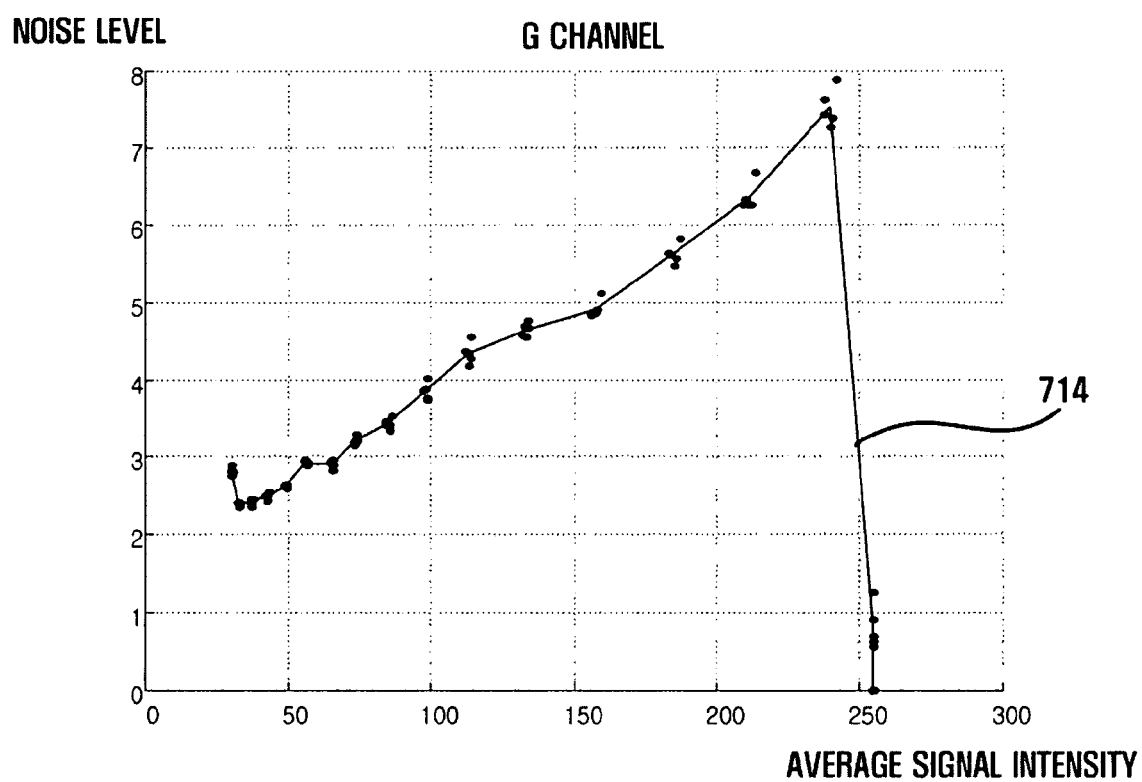
Figure 7C:
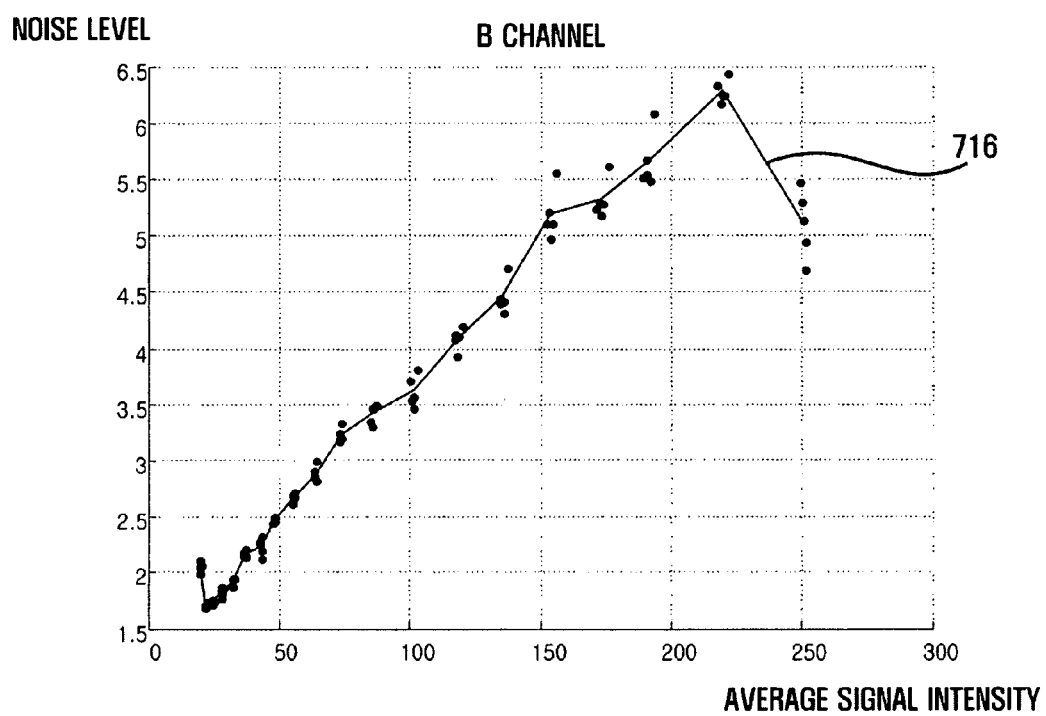

FIGS. 7A to 7C are diagrams showing the experiment results on the relationship between a signal intensity and a noise level. As shown in the drawings, in the imaging system to which the noise reduction apparatus 100 is applied, a noise level at the central pixel of a predetermined window is measured based on an average signal intensity of the pixels in a window according to each of the channels R, G, and B. Then, trend lines 712, 714, and 716 may be found using the measurement results. With the trend lines 712, 714, and 716, a lookup table showing the relationship between the signal intensity and the noise level may be generated. The noise level estimation unit 610 can estimate a noise level (hereinafter, simply referred to as "first noise level") according to the average signal intensity of the reference pixel and pixels (hereinafter, referred to as "adjacent pixels"), to which the same optical channel as the reference pixel is applied, in a window of the input image around the reference pixel using the lookup table.

Figure 8:
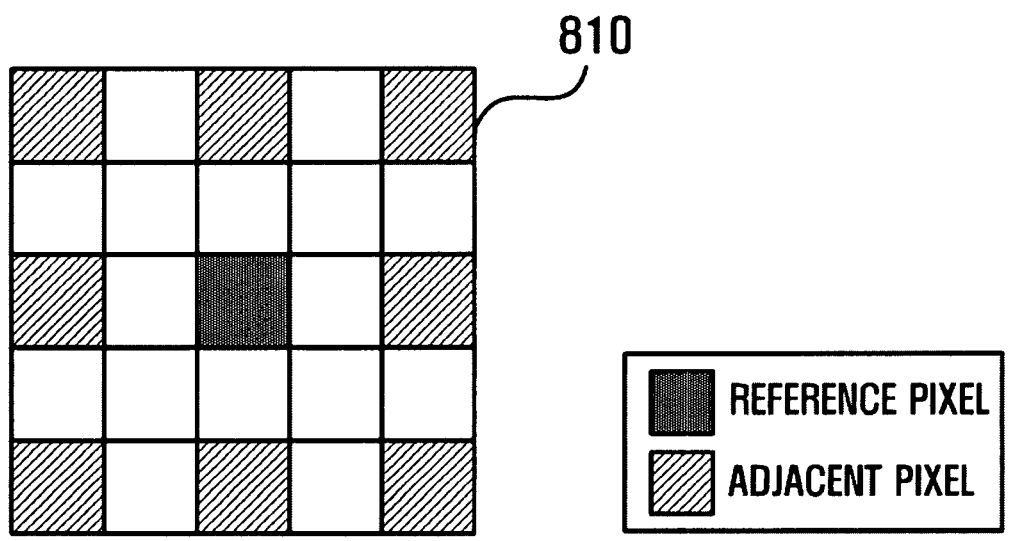
FIG. 8 is a diagram showing a window according to an embodiment of the present invention.

Here, the size of the window may be set in various ways. FIG. 8 shows a window 810 according to an embodiment of the present invention. The window 810 shown in FIG. 8 may be used with respect to each of the optical channels of R, G1, G2, and B in an input image of an RGB Bayer pattern. In the RGB Bayer pattern, pixels of the same optical channel are separated from each other at an interval of two pixels. As shown in FIG. 8, when the size of the window 810 is set to 5×5, there are eight adjacent pixels, to which the same optical channel as the reference pixel is applied, around the reference pixel.

Figure 9A:
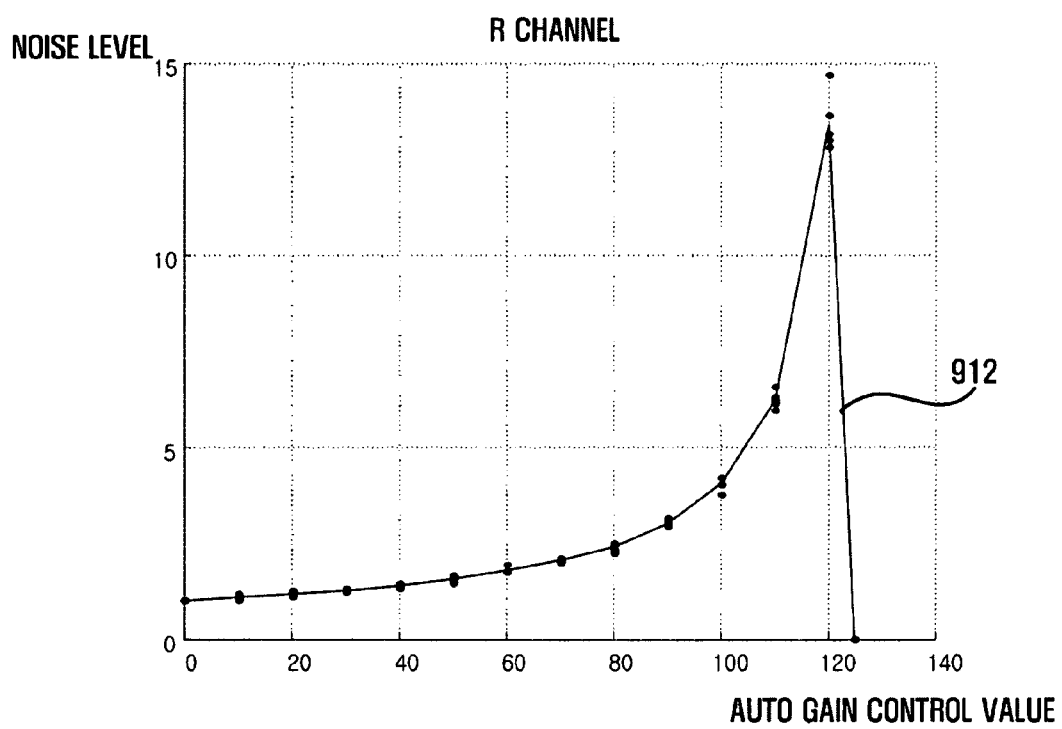
FIGS. 9A to 9C are diagrams showing the experiment results on the relationship between an auto gain control value and a noise level of an input image.
Figure 9B:
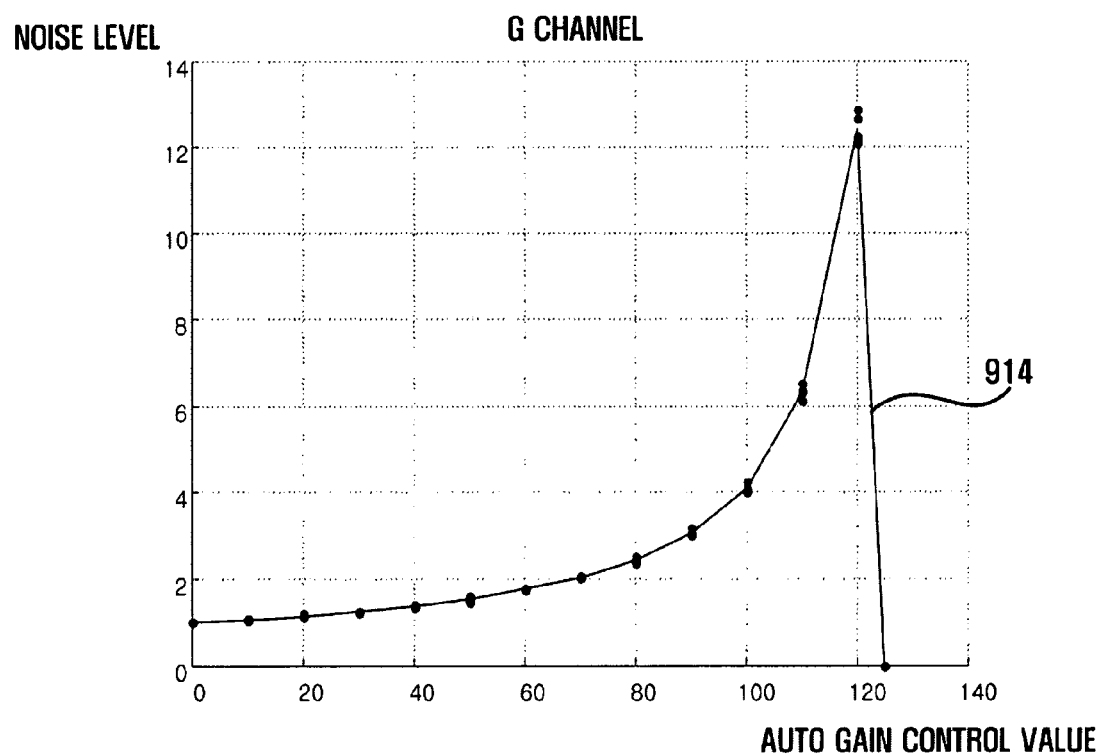
Figure 9C:
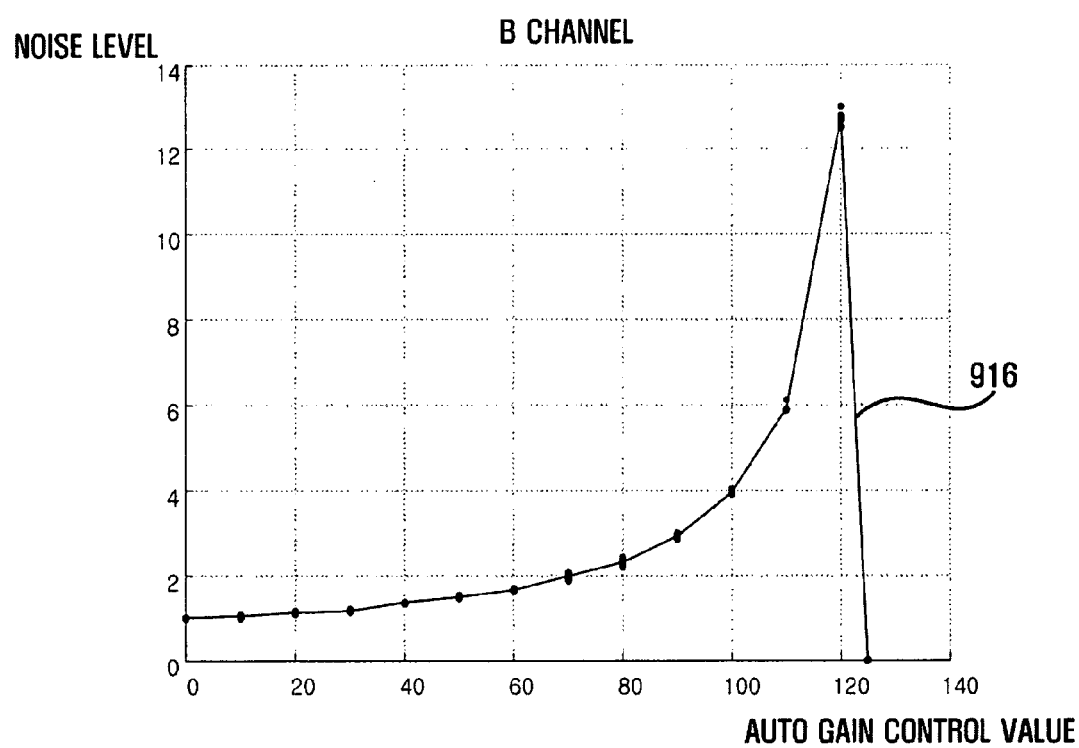

FIGS. 9A to 9C are diagrams showing the experiment results on the relationship between an auto gain control value and a noise level of an input image. As shown in the drawings, in the imaging system to which the noise reduction apparatus 100 is applied, a noise level according to an auto gain control value of each of the channels R, G, and B may be measured, and trend lines 912, 914, and 916 of the measurement results may be found. With the trend lines 912, 914, and 916, a lookup table showing the relationship between the auto gain control value and the noise level may be generated. The noise level estimation unit 610 can estimate a noise level (hereinafter, simply referred to as "second noise level") according to the auto gain control value of the input image using the lookup table.

As such, the noise level estimation unit 610 may use the first noise level or the second noise level as the estimation value of the noise level of the reference pixel. However, according to the embodiment of the present invention, the noise level estimation unit 610 may estimate the noise level with respect to the reference pixel by a predetermined arithmetic operation that uses the first noise level and the second noise level as input values. For example, the noise level estimation unit 610 may estimate an average value of the first noise level and the second noise level as the noise level of the reference pixel. Of course, this is just an example for estimating the noise level of the reference pixel.

The noise level correction unit 620 corrects the noise level of the reference pixel estimated by the noise level estimation unit 610 using the degree of activity of the local region including the reference pixel. The noise level corrected by the noise level correction unit 620 becomes a final noise level of the reference pixel.

Figure 10:
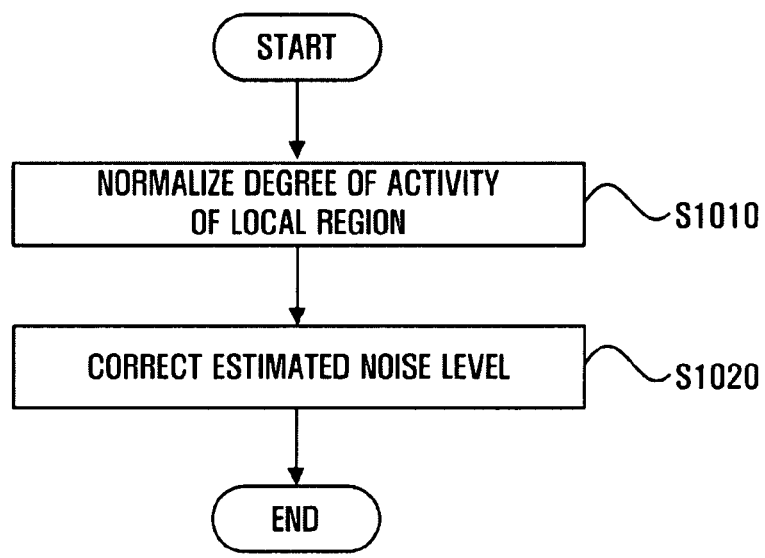
FIG. 10 is a flowchart showing a process of correcting a noise level according to an embodiment of the present invention.

A high degree of activity means that the correlation in the activity direction is noticeable in the local region. That is, the high degree of activity means that the reference pixel is considerably similar to the adjacent pixels in the activity direction. This characteristic can also be found in other pixels having the same optical channel as the reference pixel in the local region including the reference pixel. Therefore, even if the estimated noise level with respect to the reference pixel is high, if the degree of activity of the local region is high, there is a low possibility that the reference pixel actually includes noise. From this viewpoint, the noise level correction unit 620 reduces the estimated noise level of the reference pixel as the degree of activity of the local region is high, and the noise level correction unit 620 determines the noise level of the reference pixel as a value close to the estimated noise level of the reference pixel as the degree of activity of the local region is low. FIG. 10 shows a process of correcting a noise level according to an embodiment of the present invention.

Figure 11:
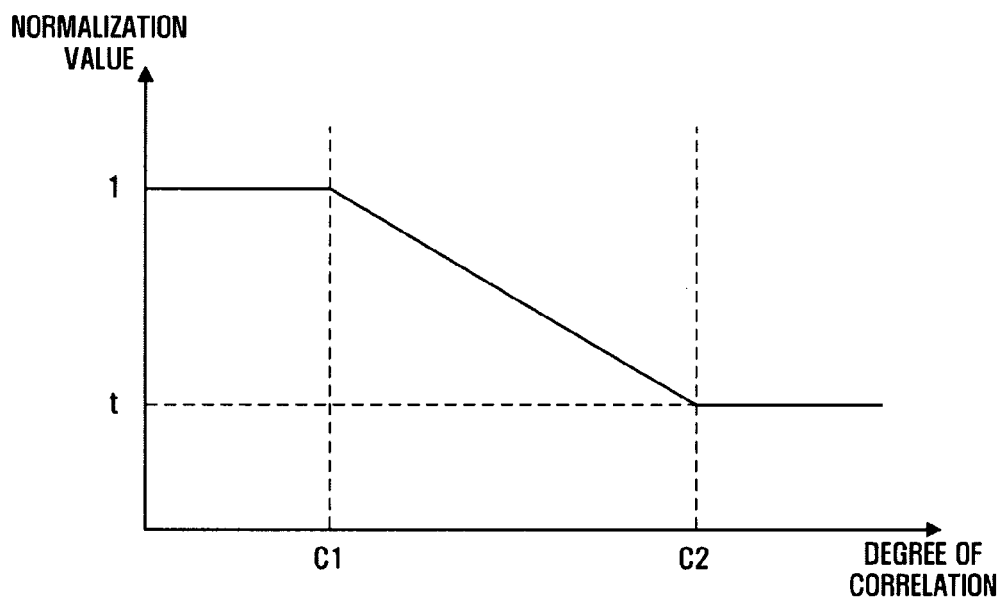
FIG. 11 is a diagram showing a function for normalizing a degree of activity according to an embodiment of the present invention.

The noise level correction unit 620 normalizes a degree of activity of a local region that is supplied by the correlation feature calculation unit 110 (Step S1010). For example, the noise level correction unit 620 may normalize the degree of activity using a function shown in FIG. 11. Referring to FIG. 11, when a degree of activity is smaller than the correlation C0, a normalization value (normalized degree of activity) is 1, and when the degree of activity is larger than the correlation C1, the normalization value is t. Further, when the degree of activity is between the correlation C0 and C1, the normalization value is linearly reduced from 1 to t. Here, t is a real number that is smaller than 1 and equal or larger than 0. The values C0, C1, and t may be set to appropriate values to perform noise reduction through the preliminary experiments.

The noise level correction unit 620 corrects the noise level estimated by the noise level estimation unit 610 using the normalized degree of activity (Step S1020). At Step S1020, the noise level correction unit 620 may determine a value obtained by multiplying the normalized degree of activity by the estimated noise level as the final noise level of the reference pixel. However, the present invention is not limited thereto. For example, the noise level correction unit 620 may determine the final noise level of the reference pixel according to another arithmetic operation that uses the normalized degree of activity and the noise level estimated by the noise level estimation unit 610 as input values.

Returning to FIG. 1, the weighted value determination unit 130 determines a weighted value of each of the pixels of the input image. Preferably, the weighted value determination unit 130 may determine a weighted value to be allocated to the reference pixel according to similarity of a window (hereinafter, simply referred to as "reference window") around the reference pixel having a predetermined size in the local region to windows including other adjacent pixels, and the noise level of the reference pixel. Here, the size of the reference window may be the same as or different from the size of the window that is used to calculate the average signal intensity for the sake of calculating the noise level, as shown in FIGS. 7A to 7C.

Figure 12:
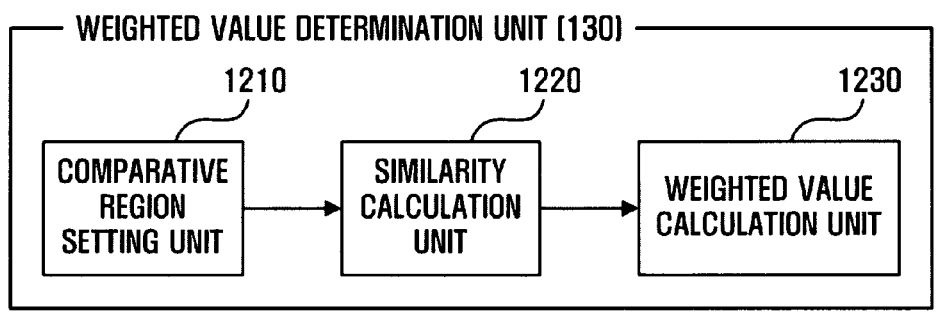
FIG. 12 is a diagram showing a weighted value determination unit according to an embodiment of the present invention.

The weighted value determination unit 130 will be described in detail with reference to FIG. 12. The weighted value determination unit 130 includes a comparative region setting unit 1210, a similarity calculation unit 1220, and a weighted value calculation unit 1230.

The comparative region setting unit 1210 sets a comparative region in the local region so as to calculate similarity to the reference window. The comparative region setting unit 1210 may set the comparative region according to the degree of activity and the activity direction of the local region. An example of an operation process of the comparative region setting unit 1210 is shown in FIG. 13.

The comparative region setting unit 1210 judges whether or not the degree of activity of the local region is larger than a threshold value (Step S1310). Here, the threshold value may be set to the same value as the correlation C1 in the function for the normalization of the degree of activity in FIG. 11. However, the present invention is not limited thereto. For example, the threshold value at Step S1310 may be set to a different value from the correlation C1 in FIG. 11.

Figure 14A:
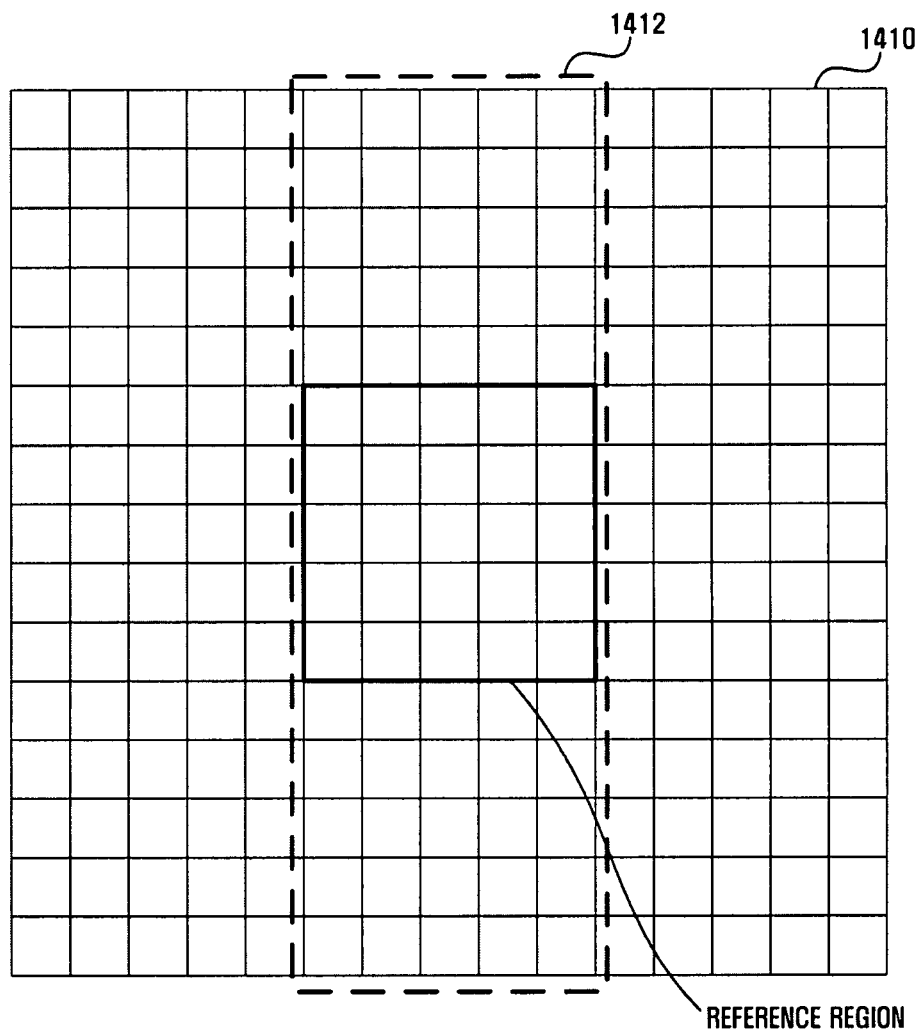
FIGS. 14A to 14D are diagrams showing comparative regions according to an embodiment of the present invention.
Figure 14B:
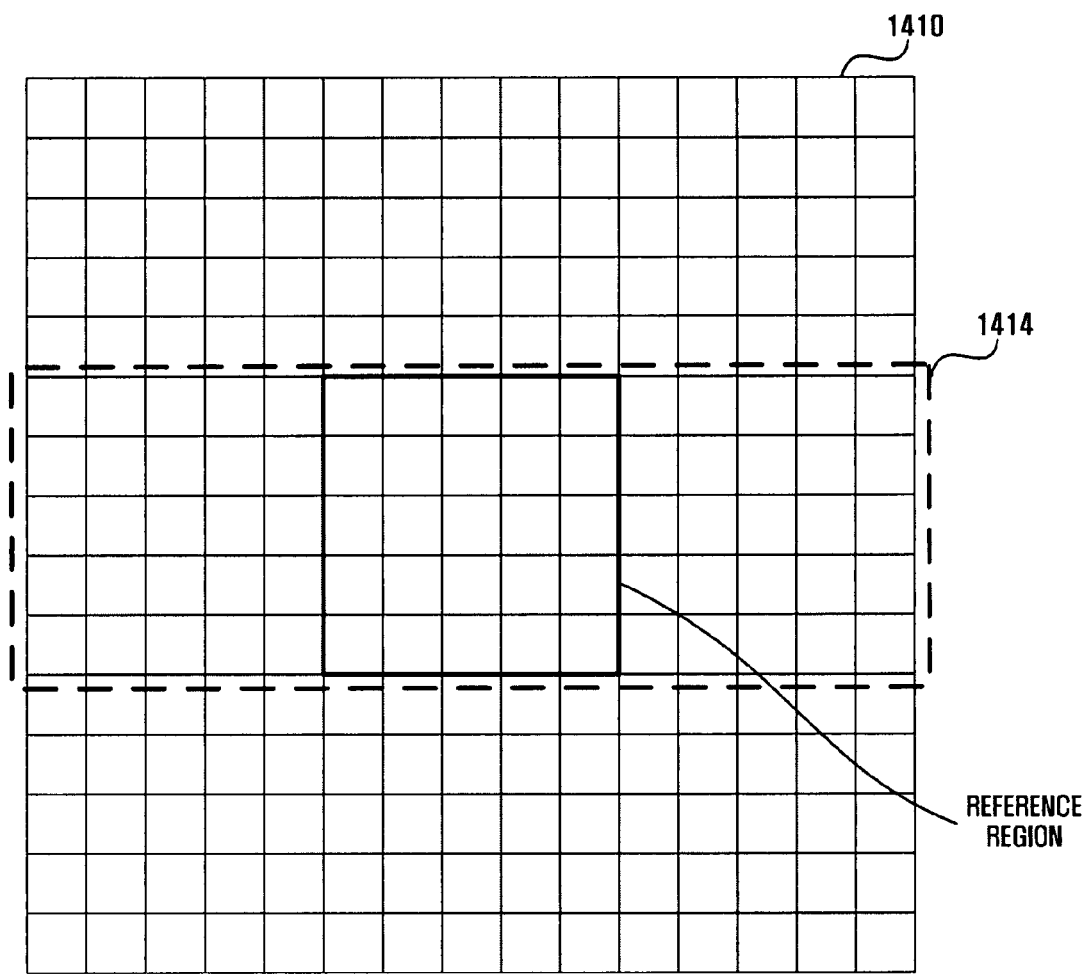
Figure 14C:
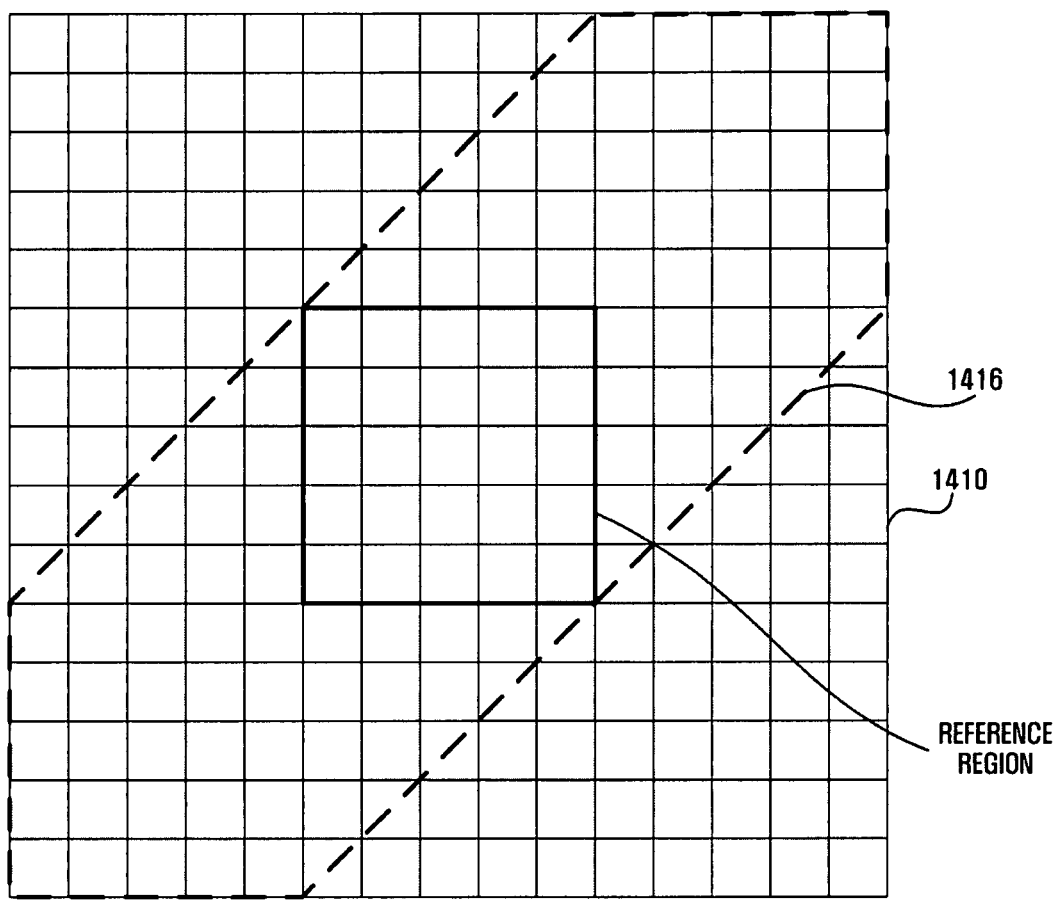
Figure 14D:
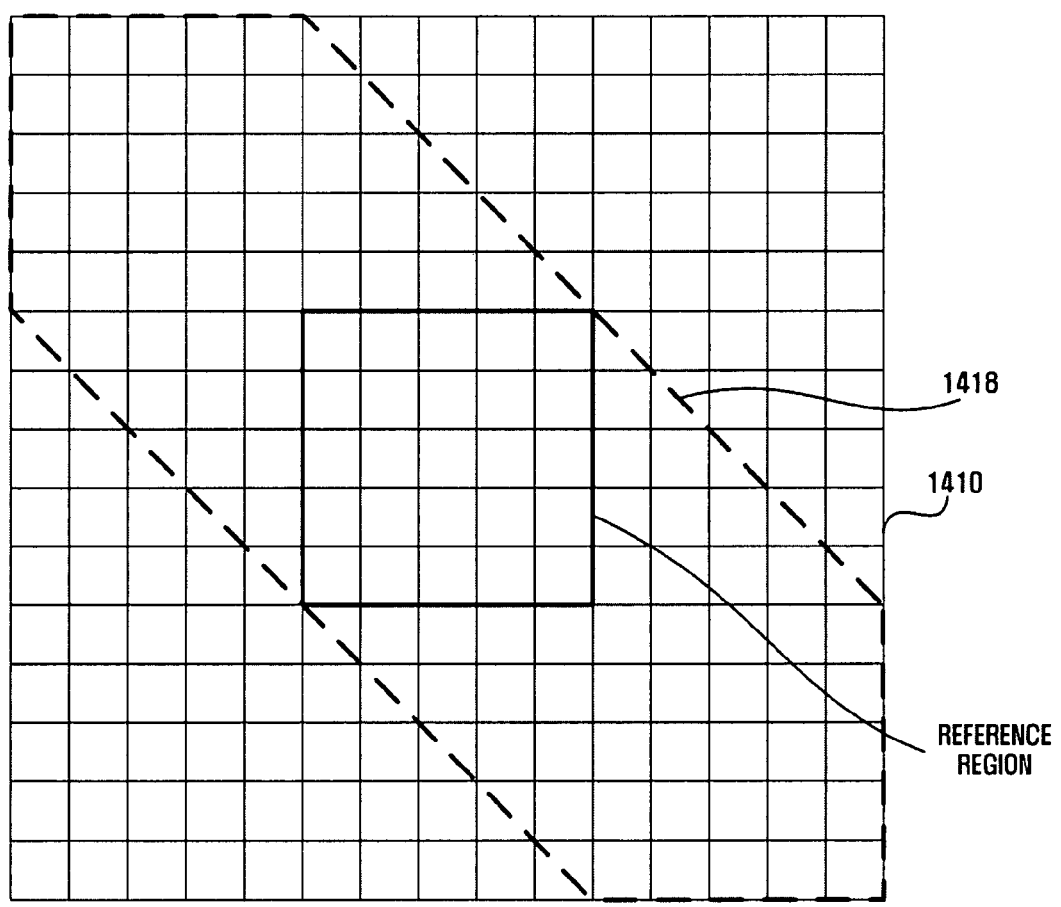

When the degree of activity is larger than the threshold value, the comparative region setting unit 1210 may set a region obtained by extending the reference window in the local region in the activity direction as a comparative region (Step S1320). FIGS. 14A to 14D respectively show a comparative region according to an embodiment of the present invention. All of the comparative regions are examples when the degree of activity of the local region is larger than the threshold value. FIG. 14A illustrates a comparative region 1412 when the activity direction of a local region 1410 is the vertical direction. FIG. 14B illustrates a comparative region 1414 when the activity of the local region 1410 is the horizontal direction. FIG. 14C illustrates a comparative region 1416 when the activity direction of the local region 1410 is the lower left to upper right direction. FIG. 14D illustrates a comparative region 1418 when the activity of the local region 1410 is the upper left to lower right direction.

Figure 13:
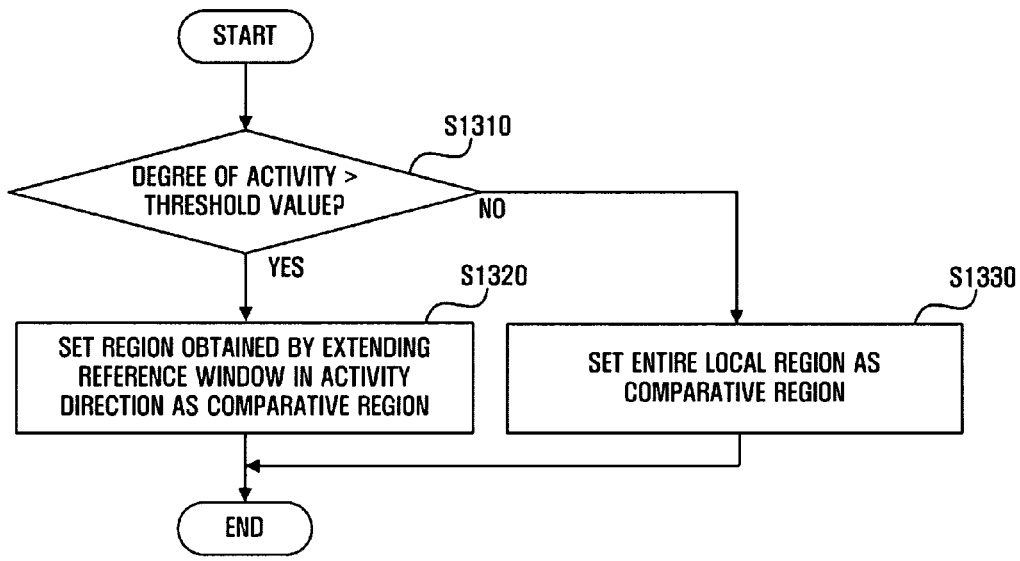
FIG. 13 is a flowchart showing a process of setting a comparative region according to an embodiment of the present invention.

Meanwhile, when the degree of activity of the local region is not larger than the threshold value as the judgment result at Step S1310 of FIG. 13, the comparative region setting unit 1210 may set the entire local region as the comparative region (Step 51330).

Figure 15A:
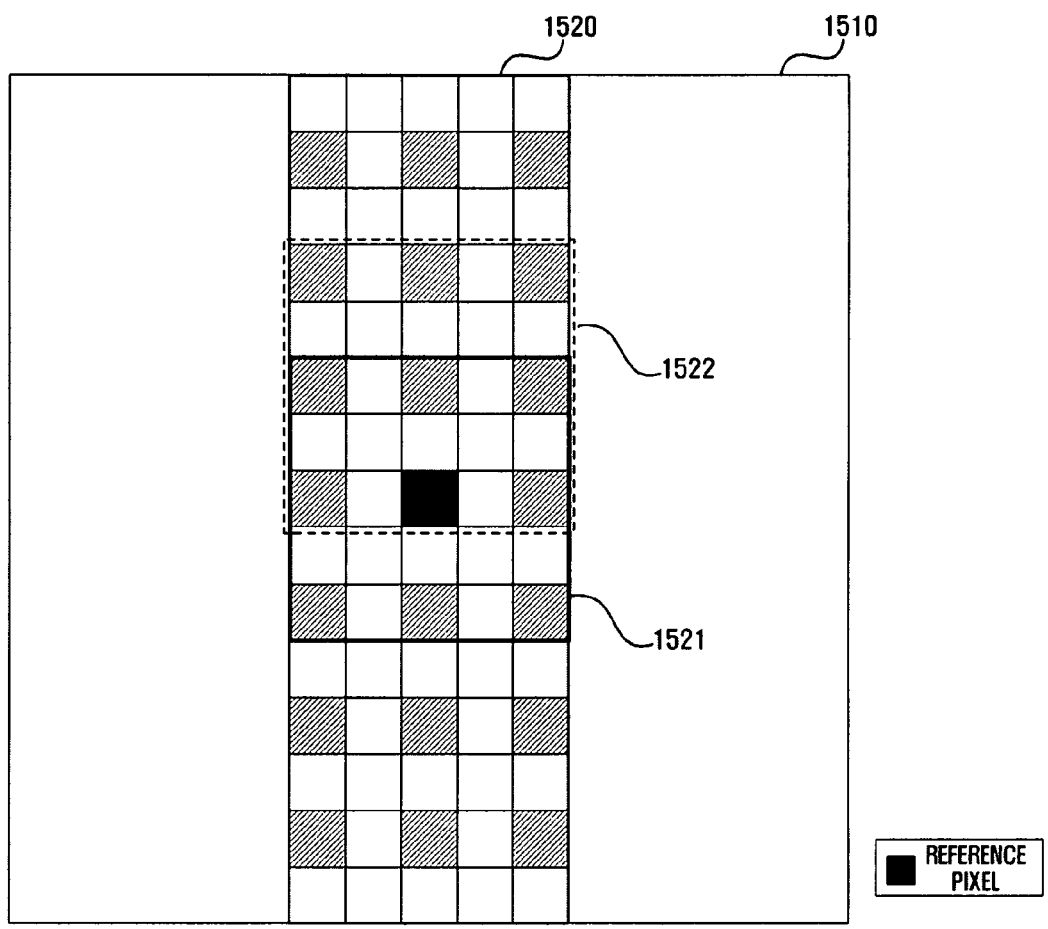
FIGS. 15A and 15B are diagrams showing a reference window and comparative windows according to an embodiment of the present invention.
Figure 15B:
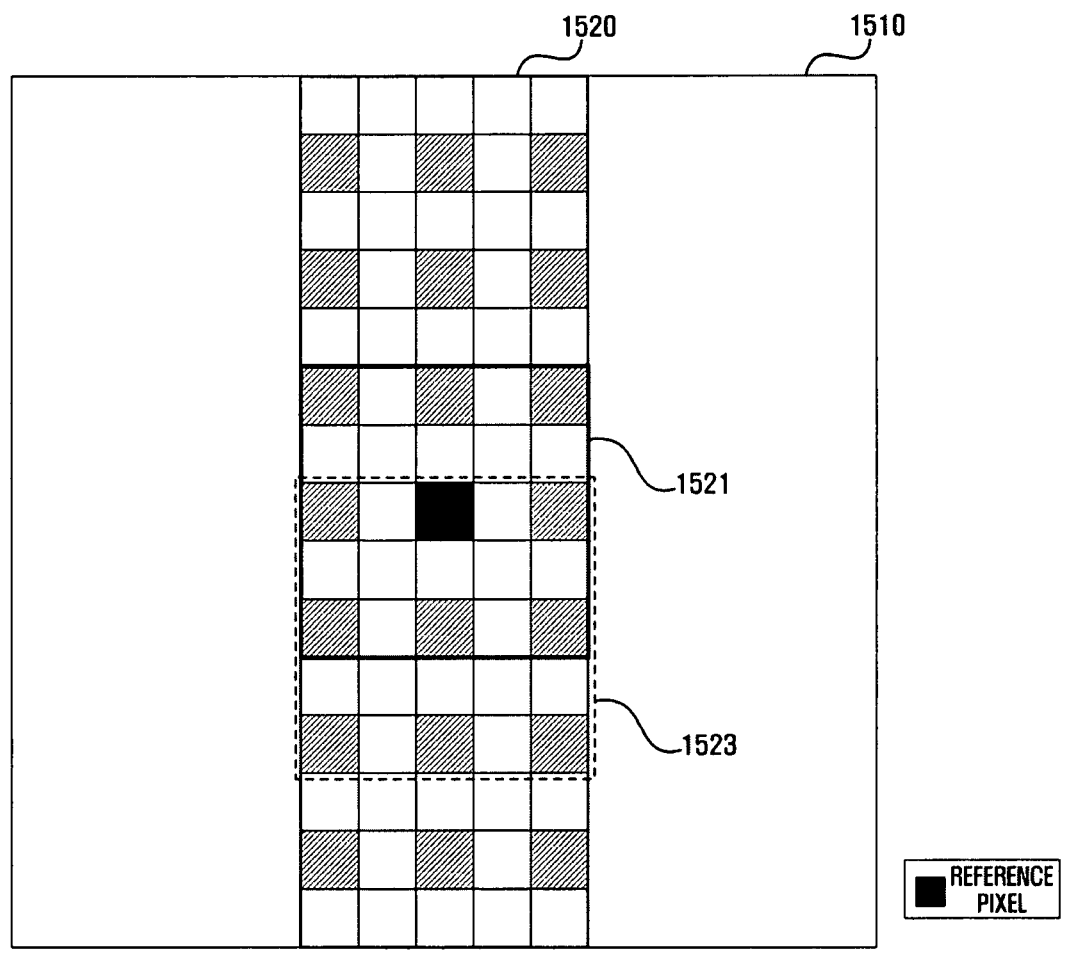

Returning to FIG. 12, the similarity calculation unit 1220 compares another window (hereinafter, referred to as "comparative window"), which has the same size as the reference window in the comparative region, with the reference window, and calculates the similarity of the reference window. For example, as shown in FIG. 15A, when a comparative region 1520 is set in the vertical direction of a local region 1510 based on a reference window 1521, the similarity calculation unit 1220 selects a comparative window 1522 in the comparative region 1520 and measures the similarity between the reference window 1521 and the comparative window 1522 using a block matching algorithm. In FIG. 15A, one comparative window 1522 is shown, but other comparative windows may further exist in the comparative region 1520. For example, FIG. 15B shows a comparative window 1523 different from the comparative window shown in FIG. 15A. In FIGS. 15A and 15B, in the comparative region 1520, pixels to which the same optical channel as the reference pixel is applied are shaded.

The similarity calculation unit 1220 compares all of the comparative windows in the comparative region with the reference window. Therefore, the similarity calculation unit 1220 calculates the similarity between each of the comparative windows in the comparative region with the reference window, and supplies an arithmetic result (for example, an average or sum of similarities), which uses the calculated similarities as input values, as the similarity of the reference window. This is just an example, but various known techniques, such as an $L^2$-norm method and the like, may be used to measure the similarity between the reference window and the comparative window.

Returning to FIG. 12, the weighted value calculation unit 1230 calculates a weighted value to be allocated to the reference pixel based on the similarity of the reference window and the noise level of the reference pixel. In addition to the similarity and the noise level, at least one constant may be used to calculate the weighted value such that an error due to characteristics of the imaging system to which the noise reduction apparatus 100 is applied is corrected. Equation 4 represents a method of calculating a weighted value according to an embodiment of the present invention.

$$k = \exp\left\{-\frac{1}{2}\left(\frac{D_m}{c \cdot \sigma'_x}\right)^2\right\} \qquad \text{Equation 4}$$

In Equation 4, k denotes a weighted value, $D_m$ denotes the similarity to the reference window, and $\sigma'_x$ denotes the noise level of the reference pixel. Reference symbol c denotes a constant that reflects the characteristics of the imaging system to which the noise reduction apparatus 100 is applied, and it may be set to an appropriate value through the preliminary experiment.

Figure 16:
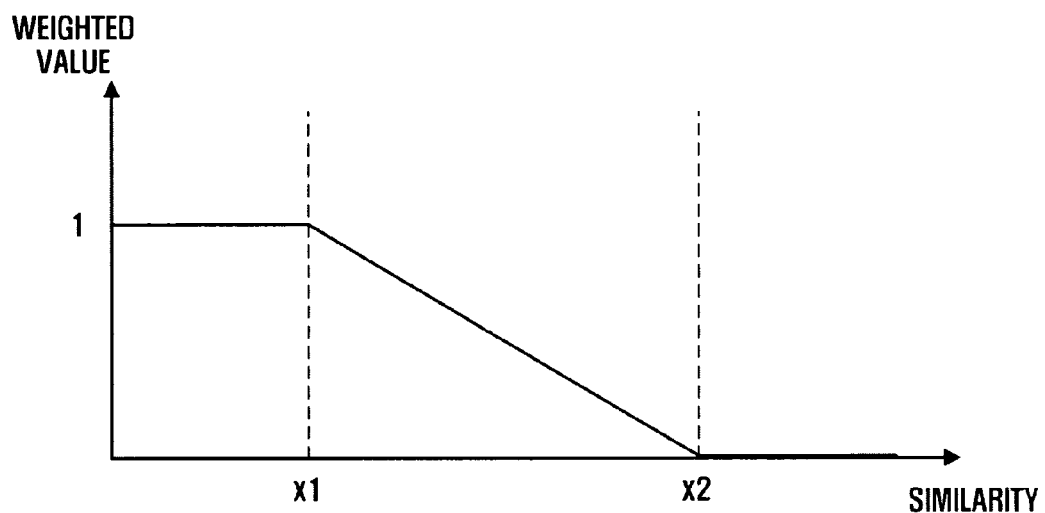
FIG. 16 is a diagram showing a function for determining a weighted value according to an embodiment of the present invention.

The method of calculating a weighted value as represented by Equation 4 is just an example, but the present invention is not limited thereto. For example, the weighted value calculation unit 1230 may calculate the weighted value using a fuzzy function shown in FIG. 16. In FIG. 16, the horizontal axis denotes the similarity to the reference window, and the vertical axis denotes the weighted value to be allocated to the reference pixel. In FIG. 16, when the similarity to the reference window is smaller than the similarity x1, the weighted value to be allocated to the reference pixel is 1, and when the similarity to the reference window is larger than the similarity x2, the weighted value to be allocated to the reference pixel is 0. Further, as the similarity to the reference window changes from the similarity x1 to x2, the weighted value to be allocated to the reference pixel is linearly reduced from 1 to 0. Here, the similarities x1 and x2 are determined according to the noise level of the reference pixel. To this end, appropriate values of x1 and x2 according to the noise level may be tabulated and the weighted value calculation unit 1230 uses the tabulated values.

According to the above-described operations, the weighted values of adjacent pixels as well as the weighted value of the reference pixel may be determined.

Returning to FIG. 1, the filtering unit 140 filters the input image using the weighted value that is allocated to each of the pixels. More specifically, the filtering unit 140 may calculate a new pixel value of the reference pixel using at least one of the weighted value of the reference pixel and the weighted values of adjacent pixels. For example, the filtering unit 140 may newly define the pixel value of the reference pixel using a weighted averaging method or a fuzzy blending method. An example of a method that is used by the filtering unit 140 to calculate the new pixel value of the reference pixel is represented by Equation 5.

$$S_x = \frac{1}{N-1} \sum_{m=1}^{N-1} [k_m I_m + (1 - k_m) I_x] \quad \text{Equation 5}$$

In Equation 5, $S_x$ denotes the final pixel value of the reference pixel according to the filtering result, and N denotes the number of adjacent pixels. Further, $I_m$ and $I_x$ denote an initial pixel value of each of the adjacent pixels and an initial pixel value of the reference pixel, respectively. Reference symbol $k_m$ denotes a weighted value of each of adjacent pixels. Equation 5 is just an example, but the present invention is not limited thereto.

In the foregoing description, each of the units designating the components, which form the noise reduction apparatus 100, can be implemented by a module. Here, the term "module" represent software and hardware constituent elements, such as a field programmable gate array (FPGA), or an application specific integrated circuit (ASIC). The module serves to perform some functions but is not limited to software or hardware. The module may reside in an addressable memory. Alternatively, the module may be provided to reproduce one or more processors. Therefore, examples of the module include elements such as software elements, object-oriented software elements, class elements, and task elements, processes, functions, attributes, procedures, subroutines, segments of program code, drivers, firmware, microcode, circuits, data, databases, data structures, tables, arrays, and parameters. The elements and the modules may be combined with other elements and units or divided into additional elements and modules.

Figure 17:
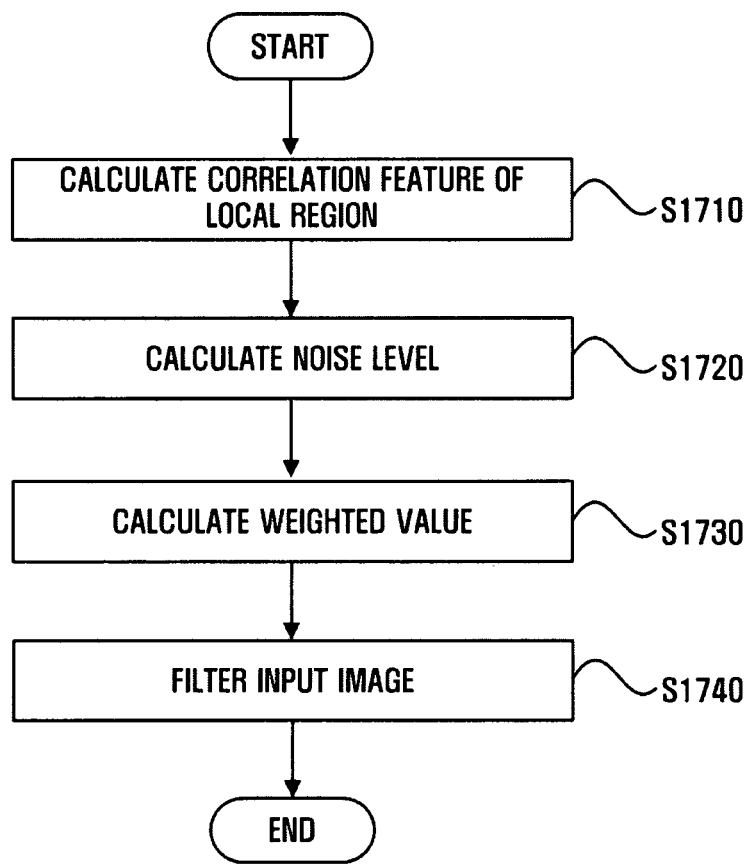
FIG. 17 is a flowchart showing a method of reducing noise according to an embodiment of the present invention.

An operation process of the noise reduction apparatus 100 having the above-described structure will be described with reference to FIG. 17. FIG. 17 is a flowchart showing a method of reducing noise according to an embodiment of the present invention.

First, the correlation feature calculation unit 110 calculates a correlation feature with respect to a local region of an input image (Step S1710). As described above, the correlation feature includes an activity direction and a degree of activity of the local region.

Next, the noise level calculation unit 120 calculates a noise level of each of the pixels of the input image (Step S1720). The noise level may be determined according to noise factors and the degree of activity calculated at Step S1710.

The weighted value determination unit 130 calculates a weighted value to be allocated to each of the pixels of the input image (Step S1730). Here, an operation of calculating similarity to a reference window may be performed before Step S1730 in order to calculate the weighted value, and the weighted value is determined according to the similarity to the reference window including the reference pixel and the noise level of the reference pixel.

Next, the filtering unit 140 filters the input image using the weighted value calculated at Step S1730 (Step S1740).

Each of Steps in FIG. 17 may further include at least one substep, and specific examples thereof will be understood by the description that has been made with reference to FIGS. 1 to 16.

Although the present invention has been described in connection with the exemplary embodiments of the present invention, it will be apparent to those skilled in the art that various modifications and changes may be made thereto without departing from the scope and spirit of the present invention. Therefore, it should be understood that the above embodiments are not limitative, but illustrative in all aspects.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of reducing noise, the method comprising:
    calculating a noise level of a reference pixel forming an input image by correcting an estimated noise level;
    determining a weighted value to be allocated to the reference pixel based on similarity of a reference window having a predetermined size including the reference pixel with respect to at least one comparative window existing in a comparative region of the input image and having the same size as the reference window, and the calculated noise level of the reference pixel, wherein the reference window is a subset of the input image; and
    filtering the input image using the determined weighted value.

2. The method of claim 1, wherein the calculating of the noise level comprises:
    estimating a temporary noise level of the reference pixel according to a noise factor of the input image; and
    correcting the temporary noise level based on a correlation feature of a local region including the reference pixel in the input image.

3. The method of claim 2, wherein the noise factor comprises at least one of signal intensity of the reference pixel and an auto gain control value that is applied when the input image is captured.

4. The method of claim 3, wherein the estimating of the temporary noise level comprises estimating the temporary noise level using a first noise level according to the signal intensity and a second noise level according to the auto gain control value.

5. The method of claim 2, wherein the correlation feature comprises information on an activity direction that is a direction having the highest correlation between pixels among a plurality of candidate directions previously set in the local region, and information on a degree of activity showing how high the correlation of the activity direction is as compared with the correlation of the candidate directions.

6. The method of claim 5, wherein the correcting of the temporary noise level comprises:
normalizing the degree of activity; and
calculating a final noise level of the reference pixel using the normalized degree of activity and the temporary noise level.

7. The method of claim 1, wherein the determining of the weighted value comprises:
setting the comparative region in a local region based on a correlation feature of the local region including the reference pixel in the input image;
selecting the comparative window in the comparative region, which has the same size as the reference window, and calculating similarity between the comparative window and the reference window; and
determining the weighted value of the reference pixel by using the calculated similarity and the noise level of the reference pixel.

8. The method of claim 7, further comprising:
calculating a correlation feature that includes information on an activity direction that is a direction having the highest correlation between pixels among a plurality of candidate directions previously set in the local region, and information on a degree of activity showing how high the correlation of the activity direction is as compared with the correlation of the candidate directions,
wherein, in the setting of the comparative region, when the degree of activity is larger than the threshold value, the comparative region is set to a region obtained by extending the reference window in the local region in the activity direction, and when the degree of activity is not larger than the threshold value, the comparative region is set to an entire local region.

9. The method of claim 1, wherein the filtering of the input image using the weighted value comprises determining a new pixel value of the reference pixel using at least one of the weighted value of the reference pixel and weighted values of adjacent pixels to which the same optical channel as the reference pixel is applied in the reference window.

10. An apparatus of reducing noise, the apparatus comprising:
at least one processor to control one or more of the following units;
a noise level calculation unit calculating a noise level of a reference pixel forming an input image by correcting an estimated noise level;
a weighted value determination unit determining a weighted value to be allocated to the reference pixel based on similarity of a reference window having a predetermined size including the reference pixel with respect to at least one comparative window existing in a comparative region of the input image and having the same size as the reference window, and the calculated noise level of the reference pixel, wherein the reference window is a subset of the input image; and
a filtering unit filtering the input image using the determined weighted value.

11. The apparatus of claim 10, wherein the noise level output unit comprises:

a noise level estimation unit estimating a temporary noise level of the reference pixel according to a noise factor of the input image; and
a noise level correction unit correcting the temporary noise level based on a correlation feature of a local region including the reference pixel in the input image.

12. The apparatus of claim 11, wherein the noise factor comprises at least one of signal intensity of the reference pixel and an auto gain control value that is applied when the input image is captured.

13. The apparatus of claim 12, wherein the noise level estimation unit estimates the temporary noise level using a first noise level according to the signal intensity and a second noise level according to the auto gain control value.

14. The apparatus of claim 11, further comprising:
a correlation feature calculation unit calculating the correlation feature,
wherein the correlation feature comprises information on an activity direction that is a direction having the highest correlation between pixels among a plurality of candidate directions previously set in the local region, and information on a degree of activity showing how high the correlation of the activity direction is as compared with the correlation of the candidate directions.

15. The apparatus of claim 14, wherein the noise level correction unit normalizes the degree of activity and calculates the final noise level of the reference pixel using the normalized degree of activity and the temporary noise level.

16. The apparatus of claim 10, wherein the weighted value determination unit comprises:
a comparative region setting unit setting the comparative region included in a local region based on the correlation feature of the local region including the reference pixel in the input image;
a similarity calculation unit selecting the comparative window in the comparative region, which has the same size as the reference window, and calculating similarity between the comparative window and the reference window; and
a weighted value calculation unit calculating the weighted value of the reference pixel using the calculated similarity and the noise level of the reference pixel.

17. The apparatus of claim 16, further comprising:
a correlation feature calculation unit calculating a correlation feature that includes information on an activity direction, which is a direction having the highest correlation between pixels among a plurality of candidate directions previously set in the local region, and information on a degree of activity showing how high the correlation of the activity direction is as compared with the correlation of the candidate directions,
wherein the comparative region setting unit sets a region obtained by extending the reference window in the local region in the activity direction as the comparative region when the degree of activity is larger than the threshold value, and the comparative region setting unit sets an entire local region as the comparative region when the degree of activity is not larger than the threshold value.

18. The apparatus of claim 10, wherein the filtering unit calculates a new pixel value of the reference pixel using at least one of the weighted value of the reference pixel and weighted values of adjacent pixels to which the same optical channel as the reference pixel is applied in the reference window.

* * * * *